Feb. 13, 1934.   H. E. GOLLINER   1,946,849
BRAKE
Filed July 23, 1932   2 Sheets-Sheet 1

Inventor
Herman E. Golliner;
By Clarence A. O'Brien
Attorney

Feb. 13, 1934.     H. E. GOLLINER     1,946,849
BRAKE
Filed July 23, 1932     2 Sheets-Sheet 2

Inventor
Herman E. Golliner,
By Clarence A. O'Brien
Attorney

Patented Feb. 13, 1934

1,946,849

UNITED STATES PATENT OFFICE 1,946,849

BRAKE

Herman E. Golliner, Buffalo, N. Y.

Application July 23, 1932. Serial No. 624,264

3 Claims. (Cl. 188—78)

This invention relates broadly to brakes and has more particular reference to vehicular wheel brakes.

In accordance with the present invention a wheel brake for vehicles, especially automobiles, is provided with means whereby the brake can be readily adjusted to compensate for wear.

Further, in accordance with the present invention a vehicular wheel brake is provided which consists of comparatively few parts, is not likely to easily get out of order, and is especially characterized by the absence of numerous springs.

The invention together with its numerous objects and advantages will be best understood from a study of the following description taken in connection with the accompanying drawings wherein:

Figure 6 is a sectional elevational view showing the manner of connecting a pivoted lever with a link as will be hereinafter more fully referred to.

Referring more in detail to the drawings it will be seen that my brake includes a brake drum 5 and an end or cover plate 6 that is of course adapted to be mounted in fixed position relative to the drum 5.

Figure 4:
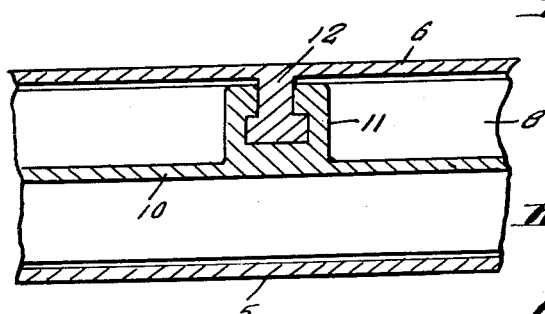
Figure 4 is a fragmentary detail sectional view taken substantially on the line 4—4 of Figure 1.

Arranged within the drum 5 are a pair of oppositely disposed shoes 7, 8, each of the shoes being arcuate and provided with linings or brake surfaces 9. Each shoe is also provided with a rib 10, and the shoes are constrained to shift transversely to the axis of the vehicle wheel through the medium of suitable guide means. Each of the aforementioned guide means comprises a pair of relatively spaced channel members 11 carried by the rib 10 and slidably engaging T-shaped ribs 12 provided on the inner side of the plate or head 6. (See Figure 4.) The sides of each channel member 11 are of course grooved for accommodating the head of a rib 12.

Rockably mounted on the inner side of the plate 6 at diametrically opposite points are curved levers 13 that have enlarged heads pivoted to the plate 6 as at 14.

Figure 1:
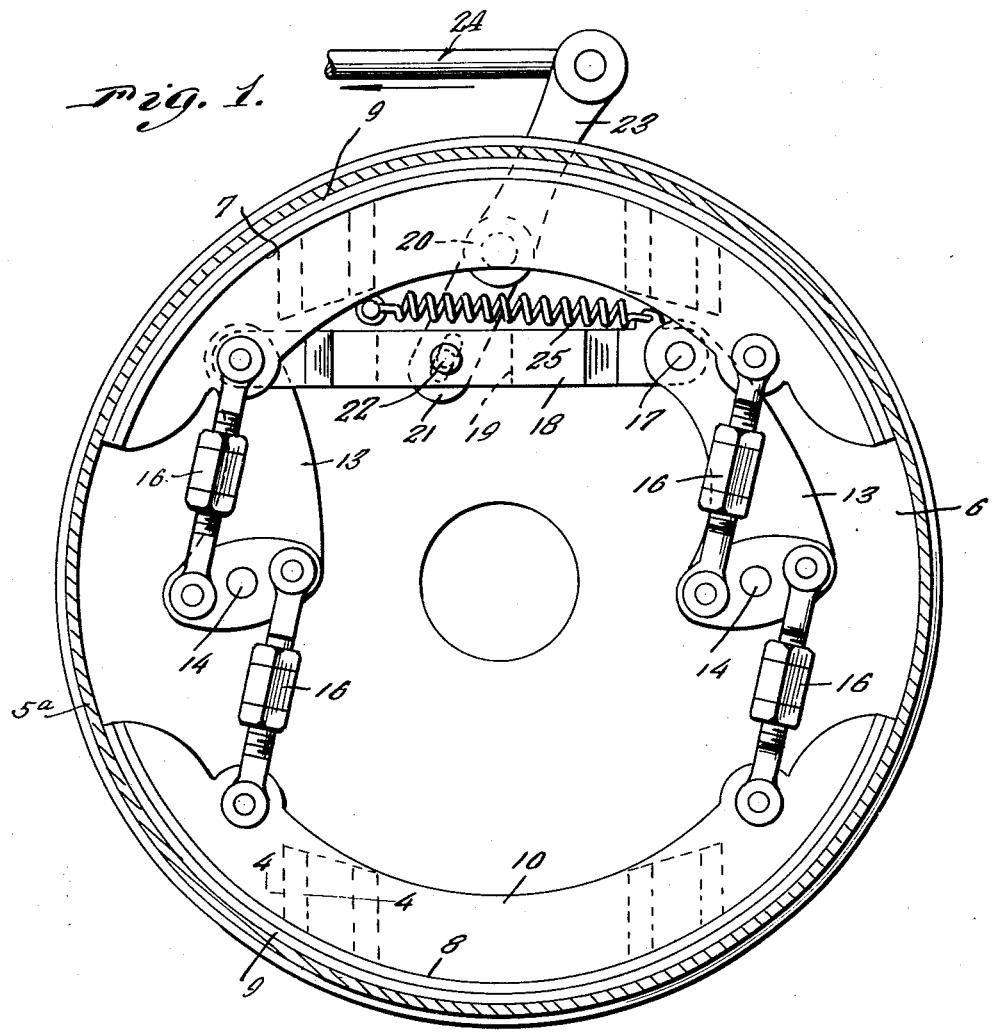
Figure 1 is a sectional view through the brake drum clearly illustrating the features of the present invention.
Figure 6:
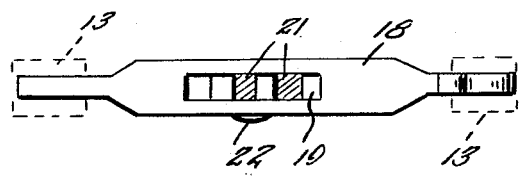
Figure 2:
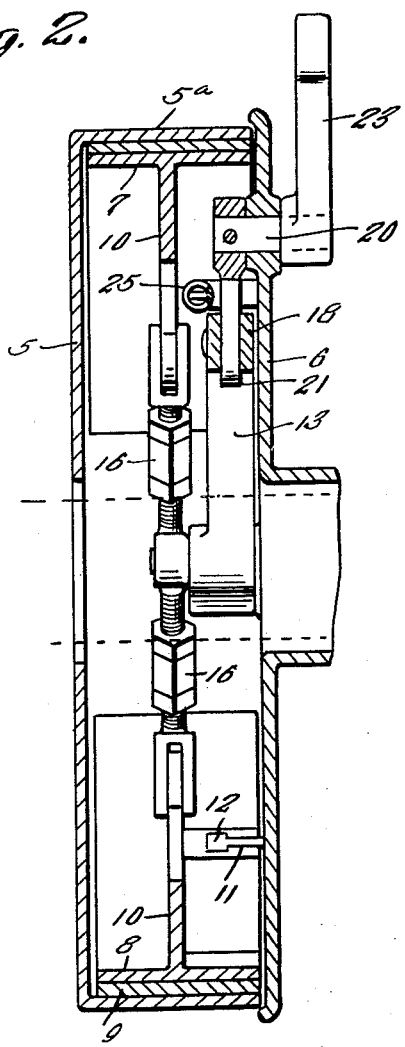
Figure 2 is a vertical transverse sectional elevational view through the brake.
Figure 3:
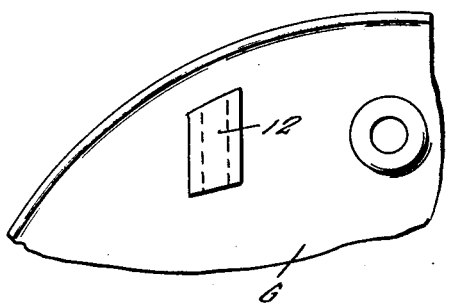
Figure 3 is a plan view of a portion of the brake drum.
Figure 5:
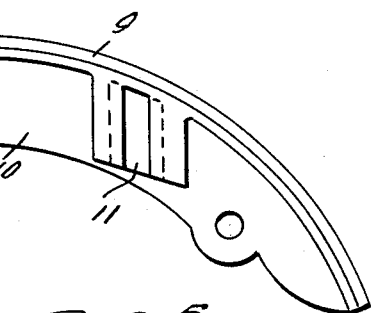
Figure 5 is a side elevational view of a portion of a brake shoe.

As shown in Figure 1 the heads of the levers 13 are pivotally connected at one end with the shoe 8 through the medium of relatively, rigid adjustable connections 16, while the other ends of the heads of said lever 13 are connected in a similar manner with the shoe 7.

Each of the connections 16, as shown, is in the nature of a turn buckle, one end of which is pivoted to a head of the lever 13 and the other end of which is pivotally connected to the rib 10 of a shoe adjacent an end of said shoe.

The free ends of the levers 13 are pivotally connected as at 17 with a link or bar 18. Bar 18 intermediate its ends is provided with an elongated slot 19.

A stub shaft 20 is journalled in a suitable bearing on the plate 6 and at its inner end the shaft 20 has suitably secured thereto an arm 21 that extends into the slot 19. Arm 21 is longitudinally slotted for accommodating a transverse bolt 22 extending between the walls of the slot 19 whereby a loose connection is provided between the arm 21 and the bar or link 18.

At its outer end the shaft 20 is provided with an arm 23 to which is connected the brake control rod 24, a portion of which is shown in Figure 1. Obviously the bar 24 may be connected with the brake pedal, emergency brake lever or other suitable actuating element with which an automobile is usually equipped.

The faces 9 of the brake shoes are normally maintained out of engagement with the rim 5a of the drum through the medium of a single coil spring 25 that is suitably anchored at one end to the plate 6 and at its other end connected with the bar 18 adjacent one end of the bar, and normally urging the bar toward the left as viewed from Figure 1.

In applying the brake it will be apparent that the rod 24 is pulled toward the left in Figure 1 causing the bar 18 to shift against the action of the spring 25 to the right in Figure 1, with the result that the levers 13 are caused to rotate in a clockwise direction, and the movement of the levers is transmitted through the connection 16 to the shoes 7, 8 whereby the shoes are forced into frictional engagement with the rim 5a of the brake drum for effecting the braking action on the vehicle wheel. Upon release of the pull on the rod 24 the parts will return to their normal or brake releasing position under action of spring 25.

From the above it will also be apparent that the brake may be readily adjusted by adjusting the connection or turn buckles 16, and the shoes being constrained to shift transversely, all parts of the braking surfaces or faces 9 will come into frictional contact with the rim 5a of the brake drum at about the same time thus preventing uneven wear on the brake surfaces so that frequent adjustment will not be necessary.

Even though I have herein shown and described the preferred embodiment of the invention, it is to be understood that the same is susceptible of further changes, modifications and improvements coming within the scope of the appended claims.

Having thus described my invention, what I claim as new is:

1. A brake including in combination a drum, a cover plate for said drum provided with ribs, a pair of oppositely disposed brake shoes arranged in said drum, channel members on said brake shoes engaging said ribs whereby said shoes are constrained to shift radially of said drum, a pair of levers pivotally mounted in said drum at diametrically opposite sides of the center of said drum, relatively rigid adjustable means pivotally connecting said levers with said brake shoes, spring means normally urging said levers to rotate in one direction, and means for rotating said levers in a relatively opposite direction against the action of said spring means.

2. In a vehicular wheel brake, a drum, brake shoes arranged in the drum to engage the rim of the latter, oppositely disposed levers arranged in the drum and having enlarged heads pivotally mounted within the drum, and arcuate shanks connected with the heads; substantially rigid adjustable means pivotally connecting the heads of the levers with said brake shoes, a bar connecting the shanks of the levers, spring means engaged with the bar normally urging the same to shift in one direction, and means for shifting the bar in a reverse direction including a rockably mounted shaft, an arm on said shaft for rotation therewith and having a slidable pivotal connection with said bar, and means for rocking said shaft.

3. In a vehicular wheel brake, a drum, a cover plate for the drum provided with ribs, brake shoes arranged in the drum and provided on one side thereof with channels engaging the ribs whereby the shoes are constrained to shift radially of the drum, a pair of arcuate levers pivotally mounted in the drum, operating connections between said levers and the brake shoes, a bar pivotally connecting said levers and means for shifting the bar to rotate the levers for applying and releasing the brake.

HERMAN E. GOLLINER.